June 11, 1929.  F. H. ROYCE  1,716,836
DEVICE TO CONTROL THE FRONT AXLES OF ROAD VEHICLES
Filed July 29, 1925
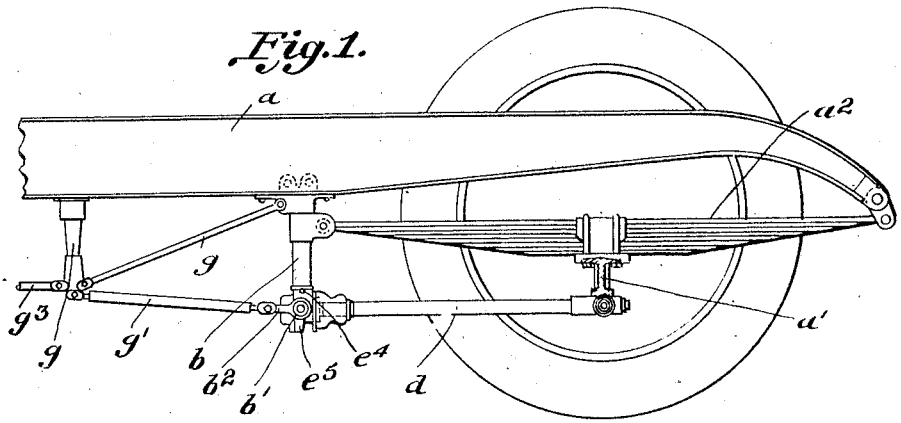
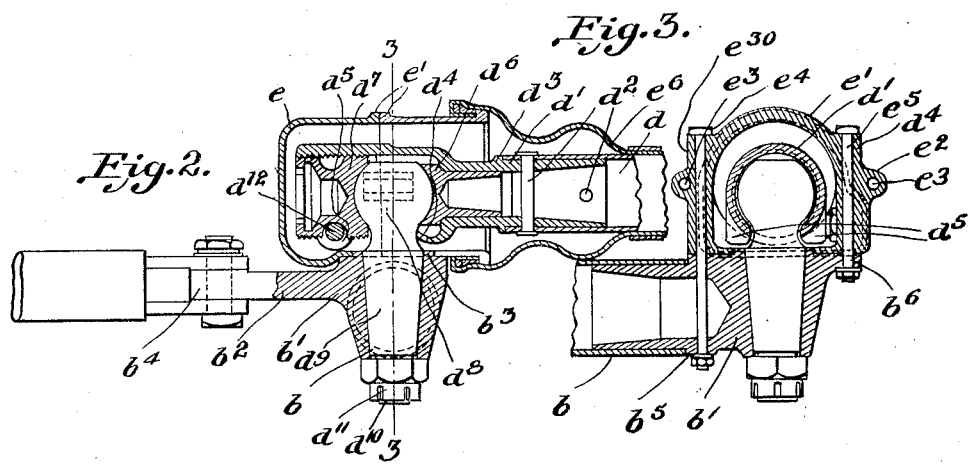
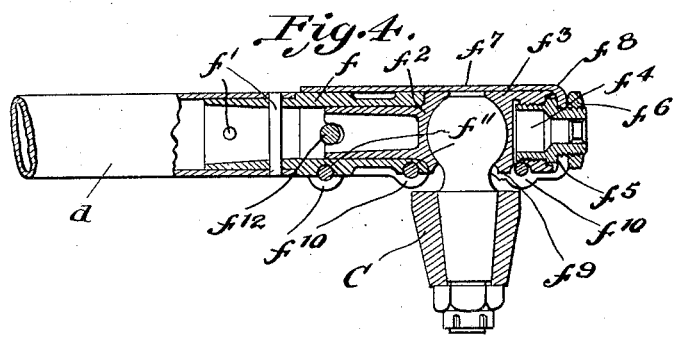
Inventor
Frederick Henry Royce
By Mason Fenwick Lawrence,
Attorneys Patented June 11, 1929.

1,716,836

UNITED STATES PATENT OFFICE.

FREDERICK HENRY ROYCE, OF WEST WITTERING NEAR CHICHESTER, ENGLAND, ASSIGNOR TO ROLLS-ROYCE LIMITED, OF DERBY, ENGLAND.

DEVICE TO CONTROL THE FRONT AXLES OF ROAD VEHICLES.

Application filed July 29, 1925. Serial No. 46,837, and in England August 25, 1924.

This invention is applicable to four wheel road vehicles provided with brakes on all the wheels and has for its object to control or support the front axle in an improved manner.

According to my invention I adopt leaf springs of the semi-elliptical form and which I pivotally hinge at the rear end to the frame, secure at the front end by shackles to the dumb iron or its equivalent, and secure centrally to the axle by U bolts, and I construct a rigid radius rod beneath each spring hinged at its rear end to the frame and at its front end to the under side of the front axle.

Preferably the effect of applying brakes to the front wheels is to apply force to the front axle in a rotational direction which apart from being an additional strain on the "U" bolts securing the axle to the spring actually causes a displacement of the axle in a rotational direction the spring assuming a "wave" shape—which displacement of the axle alters the inclination of the steering pivots and affects the steering mechanism.

This invention is a means to prevent the displacement of the axle referred to.

I construct a suspended bracket attached to the side girder of the frame arranged to carry the bolt which is threaded through the eye of the main leaf of the spring, and extend this bracket further downwards for a suitable distance, and I attach a rigid rod at one end to the lower end of the bracket and at the other end to the under side of the axle immediately under the spring anchorage, such rod being secured to the bracket and to the axle by suitable adapting means such as for example ball and socket joints.

By way of further strengthening or supporting this bracket I may rigidly fix another rigid rod at one end to the lower end of the said bracket and at the other end to the lower end of another similarly suspended bracket located further to the rear for supporting tie rods such as for example, the common arrangement of bracket and tie rods employed to stiffen the members of the frame.

In the accompanying drawing is illustrated an example of my invention.

Fig. 1 is a side elevation viewed from the inside of the chassis showing the general lay out. Figs. 2 and 3 are enlarged sectional views of the rear joint of the radius rod, the sections as to Fig. 2 being a horizontal section through the centre of the rear joint and as to Fig. 3 a vertical section on the line 3—3 of Fig. 2 and Fig. 4 is an enlarged horizontal section through the centre of the front joint. $a$ is the frame of the car, $a^1$ the front axle, and $a^2$ the front spring. $b$ is a tubular member (in Fig. 2 above the section line) rigidly secured to the frame terminating in a boss $b^1$, through which is a conical perforation and on which is formed an extension $b^2$, a spigot $b^3$, and an "eye" end $b^4$. The boss $b^1$ is also respectively perforated at $b^5$ and $b^6$ to receive bolts hereinafter referred to. $c$ is a boss with a conical perforation, integral with and underneath the front axle $d$ is a tubular member fastened at one end by a ball and socket joint to the boss $b^1$ and at the other end by a ball and socket joint to the boss $c$.

The first mentioned ball and socket joint is constructed as follows:—$d^1$ is a tubular member telescoped into the member $d$ and secured therein by rivets $d^2$ having a shoulder $d^3$ to fit against the end of the tube $d$, being for a distance cut away on one side from $d^4$ to the outer end to enable the neck of the ball to pass when the tube is threaded over the ball, with perforated bosses $d^5$ formed thereon to receive the bolt hereinafter referred to, and threaded internally at the outer end, $d^6$ is the inner pad with a tubular extension fitting into the member $d^1$ and $d^7$ is the outer pad threaded externally to engage the thread of the member $d^1$. $d^8$ is the ball with conical stem $d^9$ which fits into the hole in the boss $b^1$ such stem terminating in a threaded part $d^{10}$ which is engaged by the nut $d^{11}$. To assemble the joint the inner pad $d^6$ is inserted in position in the tubular member $d^1$ the member $d^1$ is threaded over the ball (the neck passing along the "cut away") the outer pad $d^7$ is then screwed in till the pads are in contact with the ball. The bolt $d^{12}$ is then put through the perforations in the bosses $d^5$ and the nut is screwed on and tightened, thereby pulling together the edges of the "cut away" and closing member $d^1$ firmly around the outer pad $d^7$. $e$ is a case made in two halves with abutting flanges $e^1$ with an opening fitting around the spigot $b^3$ and with perforated bosses $e^2$ and secured together by bolts $e^3$ through such bosses and one of such parts having perforated bosses $e^{30}$ and $e^{31}$ formed thereon, and the case is held in position on the boss $b^1$ by the bolts $e^4$ and $e^5$, $e^6$ is a leather gaiter secured at one end to the case $e$ and at the other to the tube $d$. The joint with the boss on the front axle is constructed as follows:—$f$ is a tubular member telescoped into the tube $d$ and secured therein by rivets $f^1$, $f^2$ is the inner pad with a tubular extension fitting into member $f$, $f^3$ is the outer pad. The outer pad is recessed on the outer end and such recess is internally threaded. $f^4$ is a hollow two diameter plug with a flange $f^5$ and threaded on its larger and smaller circumferences, $f^6$ is a binding nut, $f^7$ is a tubular member with a restricted end $f^8$ and cut away on one side from $f^9$ to the farther extremity to enable the neck of the ball to pass when the member is threaded over the ball. On each side of the cut away part are three perforated bosses $f^{10}$ to receive bolts $f^{11}$ by which the sleeve $f^7$ is held firmly to member $f$ the member $f$ having grooves formed on it to clear the bolts. $f^{12}$ is a taper bolt passing through and fitting registering holes in the members $f^7$ and $f$ and through a hole with a clearance in member $f^2$, said bolt being secured by a nut. To assemble the joint the inner pad $f^2$ is put in position in tubular member $f$, the outer pad $f^3$ with the plug $f^4$ are placed in position in the member $f^7$. The member $f^7$ is then threaded over the ball (the neck passing down the cut away side) and is then telescoped on to the member $f$. The bolt $f^{12}$ is then inserted and secured, the pad $f^3$ is then adjusted by means of the plug $f^4$, the nut $f^6$ is then tightened. Bolts $f^{11}$ are then inserted through the perforated bosses $f^{10}$ and nuts screwed up on such bolts thereby tightening the member $f^7$ around the member $f$.

To adjust the pads for wear the nut $f^6$ and the nut of the bolt $f^{11}$ on the outer pad side are loosened, the plug $f^4$ unscrewed thereby forcing the pad $f^3$ inwards until the joint is tight when the nuts are again screwed up. $g$ is a post secured to the frame, $g^1$ is a tie rod secured at one end to the extension $b^2$ and at the other to the post $g$, and $g^2$ and $g^3$ are strengthening tie rods.

The effect of the construction above described is that the main leaf of the spring and the first mentioned rod constitute a parallel control device which prevents the axle from being displaced rotationally and at the same time does not interfere with the normal action of the spring.

What I claim is:—

1. In a motor vehicle, the combination of the front axle, a frame having a side parallel to the front wheel thereof, a semi-elliptic spring fixed at its center to said axle, a link pivoted to the front end of said side and to the front end of said spring, a post depending from said frame with its free end below said axle, the rear end of said spring being pivoted to said post between the ends thereof, and a rigid distance rod under said spring and connected as a brace to the said axle and to said free end.

2. In a motor vehicle, the combination of the front axle, a frame having a side parallel to the front wheel thereof, a semi-elliptic spring fixed at its center to said axle, a link pivoted to the front end of said side and to the front end of said spring, a post depending from said frame with its free end below said axle, the rear end of said spring being pivoted to said post between the ends thereof, and a second post depending from said side rearwardly of the first mentioned post, and braces connected to the free ends of said posts and said side to hold the free end of the first mentioned post rigid relative to said side.

3. In a motor vehicle, the combination of the front axle, a frame having a side parallel to the front wheel thereof, a semi-elliptic spring hinged at its rear end indirectly to said frame and fixed at its center to said axle, a link pivoted to the front end of said side and the front end of said spring, and a rigid distance rod substantially parallel to and vertically under the rear half of said spring and connected at its opposite ends to said axle and to said frame.

4. In a motor vehicle, the combination of the front axle, a frame having a side parallel to the front wheel thereof, a semi-elliptic spring fixed at its center to said axle, a link pivoted to the front end of said axle, a link pivoted to the front end of said side and to the front end of said spring, a post depending from said frame with its free end below said axle, the rear end of said spring being pivoted to said post between the ends thereof, and a second post depending from said side rearwardly of the first mentioned post, and a rigid distance rod vertically under the rear half of said spring, and connected at its opposite ends to the said axle and to the free end of said post.

5. In a motor vehicle, the combination of the front axle, a frame having a side substantially parallel to the front wheel thereof a semi-elliptic spring extending lengthwise of and vertically below said side, said spring being fixed to said axle and having its rear end pivoted directly to said side, and a rigid distance rod substantially parallel to and vertically under said spring and connected at its opposite ends to said axle and to said frame.

In witness whereof I have signed this specification.

FREDERICK HENRY ROYCE.